(No Model.) 2 Sheets—Sheet 1.
T. P. MAHON.
FURNACE.
No. 488,171. Patented Dec. 13, 1892.
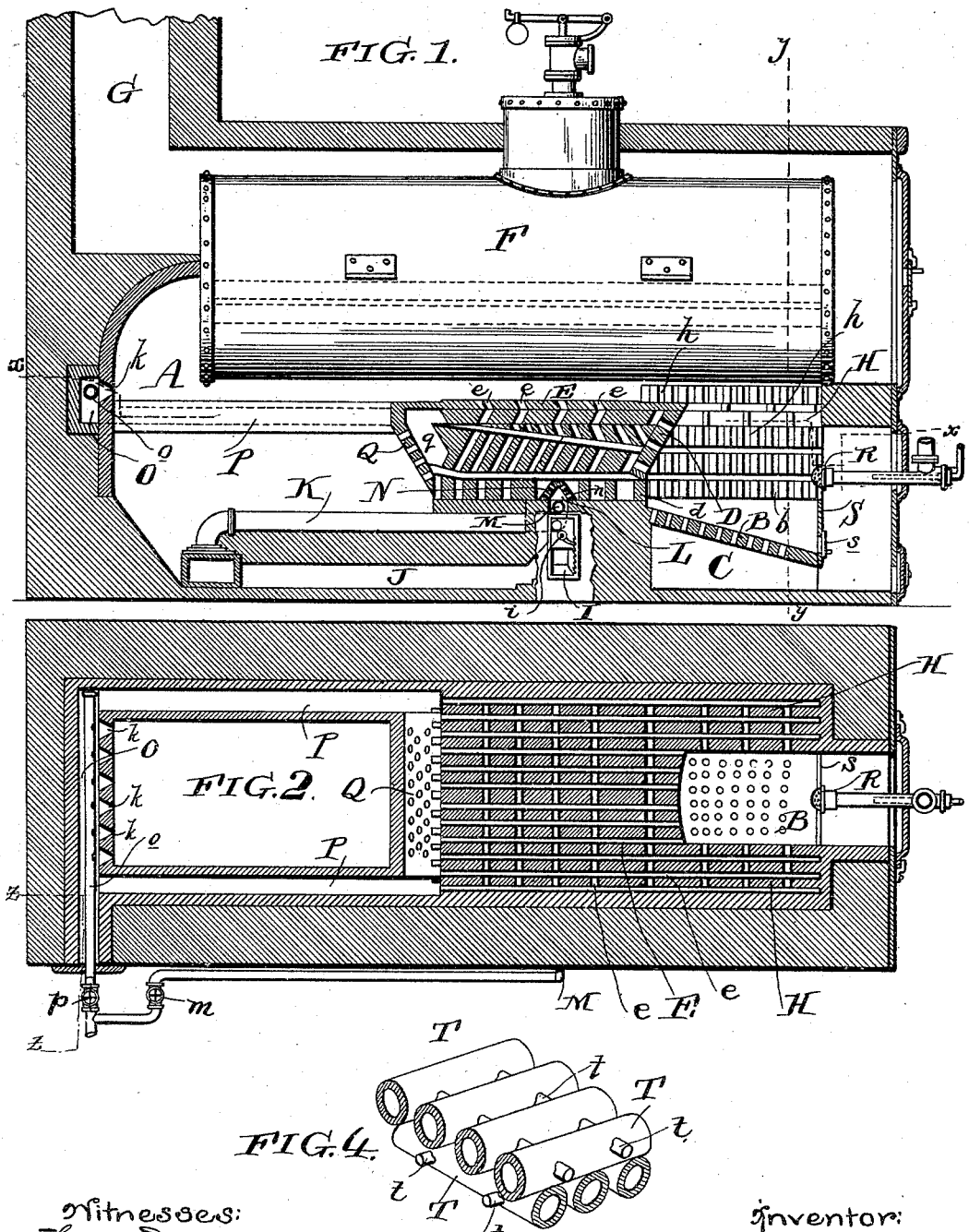

(No Model.)  
2 Sheets—Sheet 2.
T. P. MAHON.
FURNACE.
No. 488,171. Patented Dec. 13, 1892.
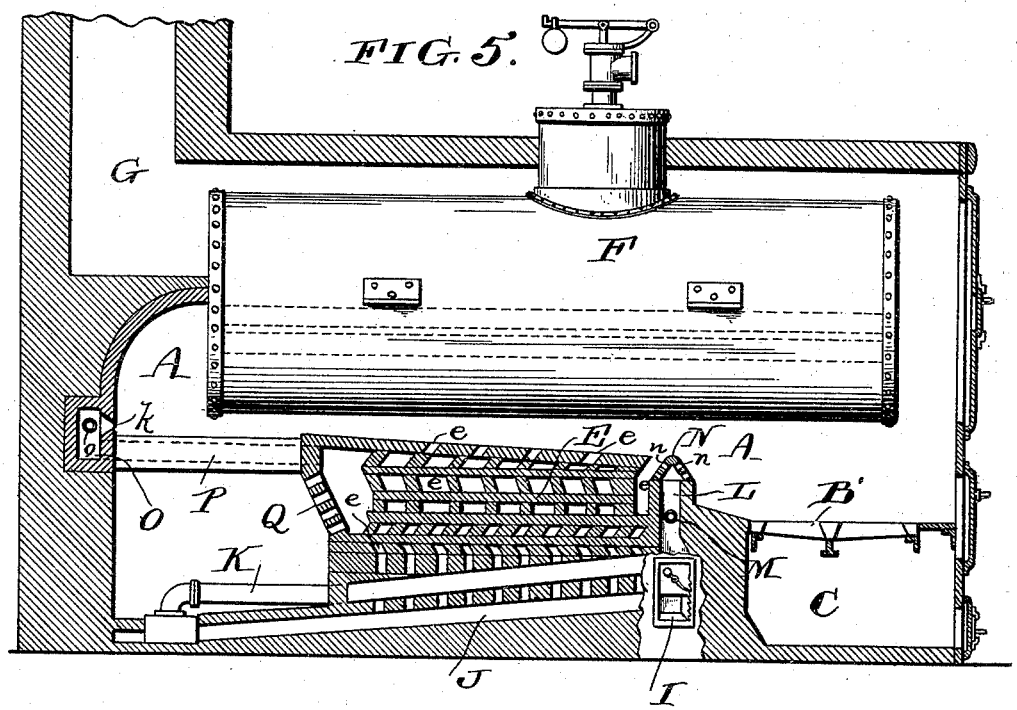
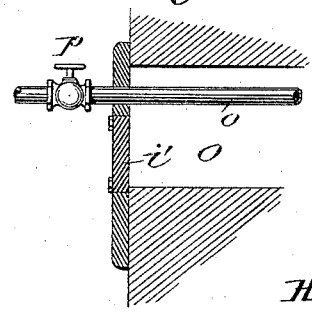
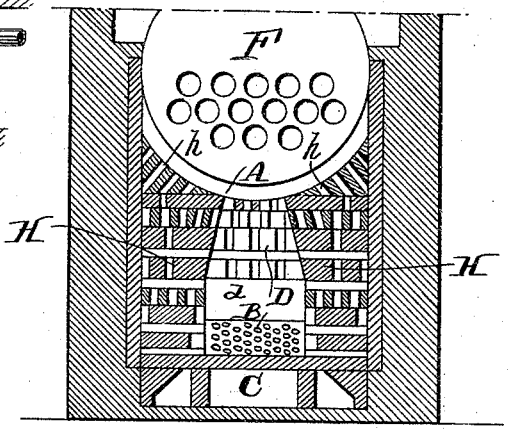
Witnesses:
Inventor:
Terrence P Mahon,
By his atty.

UNITED STATES PATENT OFFICE.

TERRENCE P. MAHON, OF PHILADELPHIA, PENNSYLVANIA.

FURNACE.

SPECIFICATION forming part of Letters Patent No. 488,171, dated December 13, 1892.

Application filed May 14, 1892. Serial No. 432,963. (No model.)

*To all whom it may concern:*

Be it known that I, TERRENCE P. MAHON, a citizen of the United States, and a resident of the city and county of Philadelphia, and State of Pennsylvania, have invented an Improvement in Furnaces, of which the following is a specification.

My invention relates to furnaces; and it consists of certain improvements which are fully set forth in the following specification and are shown in the accompanying drawings, which form a part thereof.

It is the object of my invention to increase the degree of heat obtained from the fuel consumed, and to supply the heat uniformly to the boiler throughout its exposed area, whereby greater efficiency may be obtained in the generation of steam or for other purposes.

My invention may be used with hydrocarbon fuels, and in the drawings I have shown it so. It will be understood, however, that I do not mean to necessarily limit the invention to use with a hydrocarbon-burner, as it may be employed with ordinary fuel.
My invention may be used both with stationary and locomotive furnaces.

In carrying out my invention I employ a perforated barrier, preferably of highly-refractory material, located in the combustion-chamber and in the rear of the grate, so constructed as to cause the fuel to reach a high state of combustion in passing through it.

My invention also relates to means for introducing air into the furnace and mixing the air with the heated products of combustion.

My invention also relates to certain novelties in the construction of the furnace, and in the combination of parts, which are hereinafter more fully described and claimed.
In the drawings, Figure 1 is a longitudinal sectional elevation of a furnace embodying my invention. Fig. 2 is a horizontal sectional plan view of the same on the line $xx$ of Fig. 1. Fig. 3 is a vertical sectional view on the line $yy$ of Fig. 1. Fig. 4 is a perspective view of a modified construction of the refractory barrier employed in the combustion-chamber of the furnace, and Fig. 5 is a longitudinal elevation of the furnace employing a coal-grate.
Fig. 6 is a vertical sectional view on the line $zz$ of Fig. 2.

I shall first refer to the construction shown in Figs. 1, 2, and 3, in which the furnace is adapted for burning hydrocarbon fuel.

A is the combustion-chamber.
B is the furnace-grate.
C is the ash-pit.
F is the boiler, and G the smoke-stack.
D is a perforated barrier of fire-brick or other refractory material arranged at the rear of the grate B. This barrier is preferably inclined forward at its upper portion, as shown, and constructed with a portion $d$, immediately adjacent to the grate, vertical and unperforated.
E is an obstruction of refractory material located behind the barrier D and having a series of passages $e$ through it communicating with the open space beneath the boiler. This obstruction E is preferably formed of fire-brick, with the passage-ways $e$ inclined and at successively different angles of inclination, as shown in Fig. 1. By this means the products of combustion are caused to pass through a greater area of refractory material, which being highly heated will act to produce a more thorough combustion.

Upon the sides of the front of the furnace adjacent to the grate are walls of refractory material H H, having irregular passage-ways $h$ leading through them. I prefer to arrange the upper ends of these passage-ways inclined radially toward the boiler F (if the furnace be used in connection with a steam-boiler) for the purpose of directing the heat directly and evenly upon the boiler. The walls H H may be made of fire-brick.

I is an air-inlet to the furnace, controlled by a slide or door $i$ for admitting air into the body of the obstruction E through the inlet-flue L.

M is a steam-pipe extending transversely within the inlet-flue L and provided with a series of perforations for the escape of the steam to draw the air into the furnace.

N is an angular piece, preferably of firebrick, arranged over the inlet-flue L and provided with perforations $n$ for the purpose of dividing up the air-currents and leading them to different parts of the burner.

Instead of leading the cold air directly from the inlet I to the inlet-flue L, I prefer to employ a flue J, leading from the inlet I to the rear portion of the furnace and communicating thence through a superheating-flue K with the inlet-flue L. By this means the air is thoroughly heated before it is introduced into the obstruction of refractory material D.

O is a second air-flue arranged transversely at the rear of the combustion-chamber, with a series of inlet-ports $k$ opening thereinto. This flue is also provided with an inlet-door $i'$, Fig. 6, and a perforated steam-pipe $o$ for drawing the air into the flue.

P P are communicating passage-ways or heat-flues leading from the obstruction of refractory material E to the flue O for conducting hot air thereto.

Q is a perforated barrier, preferably inclined, located at the rear of the obstruction of refractory material E and forming the back portion thereof, but preferably with a more or less open space between the barrier and the body of the refractory material.

R is an oil-nozzle for introducing oil into the furnace.

S is a plate located in front of the grate B and extending above it and arranged immediately below the oil-nozzle R. The lower part of the plate S may be provided with a door $s$, which thus opens directly above the grate. The grate B is preferably perforated and inclined downward toward the front, as shown.

In the construction shown in Fig. 5 the furnace is adapted for the burning of ordinary fuel on the fuel-grate B'. In this construction the inclined barrier D and the walls of refractory material H H on the sides of the grate B' may be omitted. In other respects the construction is substantially the same. If desired, however, the barrier D and walls H H may be employed with the fuel-grate B', as in the construction shown in Figs. 1, 2, and 3.

In Fig. 4 is shown a modified construction of the fire-brick for forming the walls, perforated barriers, and obstructions of refractory materials.

T T are a series of tubular pieces of fire-brick provided with small lateral projections $t$, which serve both to hold the pieces T in position with reference to each other out of contact, so as to afford spaces for the passage of the products of combustion between the adjacent pieces T as well as through them. These pieces may be made angular or curved in shape, if desired. The products of combustion from the grate B pass partly through the walls H H to the surface of the boiler and partly through the barrier D to the obstruction E, where they are brought in contact with a mass of highly-heated refractory material and a more thorough combustion is obtained. The walls H H, barriers, and obstruction becoming thus highly heated act in themselves as fuel. The air and steam which enter from the flue L through the perforations $n$ of the piece N, coming directly in contact with the heated refractory material E, become highly heated also, and the air and steam in the flue O in the rear of the furnace are mixed with the heated products which pass through the flues P P. The irregular passage-ways $e$ through the refractory material E form more or less of an obstruction to the passage of the products of combustion, and thus cause them to come in contact with the highly-heated material, and thus a higher degree of heat is obtained.

The steam-pipes $o$ and M may be provided with valves $p$ and $m$, so that the supply of steam to either one or the other may be cut off when desired.

With the oil-burner and construction shown in Figs. 1, 2, and 3 the flame from the burner strikes the portion $d$ of the barrier D immediately above the grate, and a portion of the flame is guided back over the inclined grate B to consume any drippings that may have fallen thereon. I have shown the furnace with a boiler F. It will be understood, however, that it may be used without a boiler, if desired, and while I prefer such mere details of construction as I have shown for the purpose of more fully illustrating the invention, I do not mean to limit my invention to them, as they may obviously be varied without departing from the invention.

What I claim as new, and desire to secure by Letters Patent, is—

1. In a furnace, the combination, with the combustion-chamber, of an obstruction of refractory material located therein adjacent to the fire-grate and provided with passage-ways for the passage of heated air, an air-inlet flue opening to the base of said obstruction of refractory material beyond the fire-grate, and a second air-inlet flue independent of the first opening into the rear of the combustion-chamber at a distance from the obstruction of refractory material to introduce a fresh supply of air at the rear of the combustion-chamber.

2. In a furnace, the combination, with the combustion-chamber, of an obstruction of refractory material located therein adjacent to the fire-grate and provided with passage-ways for the passage of heated air, an air-inlet flue opening to the base of said obstruction of refractory material, a second air-inlet flue opening into the rear of the combustion-chamber at a distance from the obstruction of refractory material, and a connecting passage-way between the body of said obstruction of refractory material and a flue at the rear of the combustion-chamber.

3. In a furnace, the combination, with the combustion-chamber, of an obstruction of refractory material located therein adjacent to the fire-grate and provided with passage-ways for the passage of heated air, an air-inlet flue opening to the base of said obstruction of refractory material, a second air-inlet flue opening into the rear of the combustion-chamber at a distance from the obstruction of refractory material, a connecting passage-way between the body of said refractory material and the flue at the rear of the combustion-chamber, and perforated steam-pipes in said inlet-flues to draw the air into them.

4. In a furnace, the combination of a fire-grate, an obstruction of refractory material located within the combustion-chamber and in the rear of the grate and provided with passage-ways for the products of combustion, an air-inlet located adjacent to the front of the combustion-chamber, an air-flue opening adjacent to the front portion of the obstruction of refractory material, and a horizontal passage-way traversing the combustion-chamber and leading from the air-inlet to the rear of the combustion-chamber and thence forward to the air-flue at the front of the obstruction, whereby the external air in passing from the air-inlet to the air-flue leading to the obstruction traverses horizontally the combustion-chamber of the furnace.

5. In a furnace, the combination of the obstruction of refractory material E, located within the combustion-chamber of the furnace, an air-inlet flue located at the rear of the combustion-chamber and at a distance from the obstruction of refractory material, and a communicating passage-way for hot air leading from the obstruction of refractory material to the inlet-flue at the rear of the chamber.

6. In a furnace, the combination of the obstruction of refractory material E, located within the combustion-chamber of the furnace and having a barrier Q, located at the rear thereof and at a distance from the body of the obstruction, so as to form an open space $q$, an air-inlet flue located at the rear of the combustion-chamber and at a distance from the obstruction of refractory material, and a communicating passage-way through the barrier Q from the air-space $q$ to the air-inlet flue at the rear of the furnace.

7. In a furnace, the combination of the fire-grate with a perforated barrier D of refractory material located at the inner end of the grate and extending above it, having the vertical portion $d$ perforated and immediately above the grate, and its upper portion inclined forward toward the front of the furnace and extending over a portion only of the grate.

8. In a furnace, the combination of a boiler, a grate, and the walls H, formed of refractory material and having their upper portions arranged adjacent to the surface of the boiler and provided with a series of irregular passage-ways $h$, said passage-ways being inclined radially toward the boiler at the upper portion of the walls.

9. A refractory obstruction for furnaces, &c., consisting of tubular pieces of fire-clay T, provided with projections $t$, substantially as and for the purpose described.

10. In a furnace, the combination of the grate, an obstruction of refractory material located within the combustion-chamber and in the rear of the grate, provided with passage-ways for the products of combustion, an air-inlet flue opening within the obstruction of refractory material, and an angular piece N, arranged over the air-flue and having its two angular sides provided with perforations, whereby the air passing through said angular piece is distributed on each side into the body of the obstruction of refractory material.

In testimony of which invention I have hereunto set my hand.

TERRENCE P. MAHON.

Witnesses:
ERNEST HOWARD HUNTER,
C. M. DIETTERICH.